(No Model.)
E. T. GORDON.
ART OF MANUFACTURING TURNING LATHES.
No. 281,263. Patented July 17, 1883.
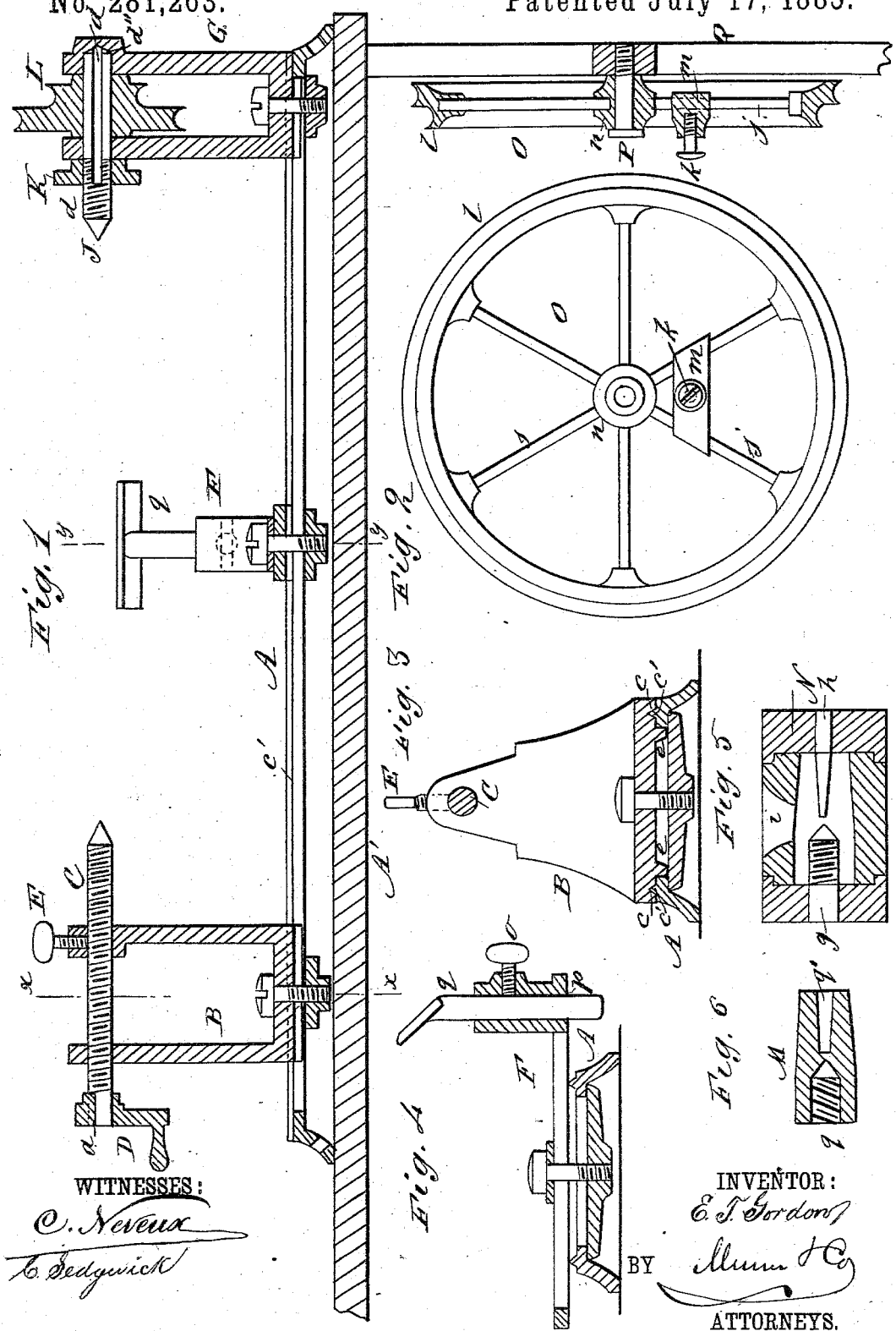

UNITED STATES PATENT OFFICE.

EDGAR T. GORDON, OF NEW YORK, ASSIGNOR TO WILLIAM H. GOMES, OF BROOKLYN, N. Y.

ART OF MANUFACTURING TURNING-LATHES.

SPECIFICATION forming part of Letters Patent No. 281,263, dated July 17, 1883.

Application filed July 7, 1882. (No model.)

*To all whom it may concern:*

Be it known that I, EDGAR T. GORDON, of the city, county, and State of New York, have invented a new and useful Improvement in the Method of Casting Parts of Lathes of Soft Metal, of which the following is a full, clear, and exact description.

The object of the invention is to save the labor of tapping, drilling, planing, and keying, which constitutes such a large element of the cost of lathes, by casting certain parts as hereinafter described.

Reference is to be had to the accompanying drawings, forming part of this specification, in which similar letters of reference indicate corresponding parts in all the figures.

Figure 1 is a sectional elevation of my improved lathe, showing it attached to a bench or table. Fig. 2 is a front elevation of the drive-wheel removed from its axle. Fig. 3 is a sectional elevation of the tail-stock and bed-piece, taken on the line $x$ $x$ of Fig. 1. Fig. 4 is a similar view of the tool-rest, taken on the line $y$ $y$ of Fig. 1. Fig. 5 is a sectional view of a mold for casting the chucks, and Fig. 6 is a sectional view of one of the chucks.

A is the bed-piece of the lathe, placed upon the bench or table A'.

B is the tail-stock, carrying the threaded spindle C and set-screw E for the spindle.

F is the sliding rest, which slides upon the bed-piece A.

G is the head-stock, carrying the spindle J, face-plate K, and pulley L.

M is a chuck cast in the mold N, and O is the drive-wheel, which runs upon the axle P, screwed into the upright Q, immediately below the pulley L.

In casting, the tail-stock B, the set-screw E, and the spindle C, which may be of iron, and having been first threaded and pointed at one end, and slotted, as shown at $a$, at the other, are placed in the mold. The metal is now poured in, and the stock B and handle D are both cast at once, the slot $a$ answering the purpose of keying the handle D on the spindle C.

$c$ $c$ represent the gutters formed in the bottom of the stock to fit upon the ribs $c'$ $c'$ of the bed-piece, and $e$ $e$ are projections adapting the stock to be used with flat-bed lathes.

In casting the pulley L and face-plate K, the spindle J, which may be of iron, is first threaded and pointed, as shown at $d$, and slotted, as shown at $d'$, and then placed in the mold, and then the metal is poured, casting the pulley L and face-plate K both at the same time. In this manner the slot $d$ and threads of the spindle permanently secure and key the face-plate on the spindle J, and at the same time key the pulley L, so that while it cannot revolve on the spindle, it yet can slide off at the blunt end of the spindle.

The head-stock G is cast without boring or drilling by first placing a separate solid spindle of the same size as the spindle J in the mold and then pouring the metal in the mold, the solid spindle being so arranged as to form the socket $d''$ for the blunt end of the spindle J, as shown in Fig. 1.

In casting the chuck M, which is adapted to be screwed upon the spindle J for holding a drill or other tool, the mold N is first provided at one end with the pointed and threaded spindle $g$, and at the opposite end and in line with the spindle $g$ with the square tapering piece of steel $h$, and then the metal is poured through the gate $i$ in the mold, the spindle $g$ forming the threaded recess $q$ for the spindle J, and the piece of steel $h$ forming the socket $q'$ for receiving the shank of the drill or other tool.

In casting the drive-wheel O, the spokes $j$, crank-screw $k$, and a center rod or piece to form the hole through the hub are first placed in the mold, and the metal is then poured in, casting the rim $l$, plate $m$, and hub $n$ all at the same time.

The slide-rest F is cast without drilling or tapping by placing the screw $o$ and a bar to form the passage $p$ for the tool-rest $q$ in the mold, and then the metal is poured in.

In this manner it will be seen that a lathe for doing light turning and for the use of boys may be produced at very small cost, as all of the parts of the lathe are cast and made to fit without turning or tapping, thus saving a great deal of labor and expense.

Having thus described my invention, what I claim as new, and desire to secure by Letters Patent, is—

As an improvement in the art of making toy turning-lathes, preparing the wearing portions and other parts, as herein specified, of steel or iron, and completing the structure severally by casting metal in and around said prepared parts while confined in molds, substantially as described.

EDGAR T. GORDON.

Witnesses:
 H. A. WEST,
 C. SEDGWICK.